United States Patent
Peterson

(10) Patent No.: US 7,573,145 B2
(45) Date of Patent: Aug. 11, 2009

(54) ELECTRIC POWER GENERATION SYSTEM CONTROLLED TO REDUCE PERCEPTION OF OPERATIONAL CHANGES

(75) Inventor: Mitchell E. Peterson, Maple Grove, MN (US)

(73) Assignee: Cummins Power Generation IP, Inc., Minneapolis, MN (US)

(*) Notice: Subject to any disclaimer, the term of this patent is extended or adjusted under 35 U.S.C. 154(b) by 439 days.

(21) Appl. No.: 11/600,937

(22) Filed: Nov. 16, 2006

(65) Prior Publication Data

US 2008/0116695 A1    May 22, 2008

(51) Int. Cl.
*H02P 9/04* (2006.01)

(52) U.S. Cl. ............... 290/44; 290/40 C; 290/40 A; 290/40 D; 290/41; 290/1 A

(58) Field of Classification Search ........... 290/40 C, 290/40 A, 40 D, 41, 1 A, 1 B
See application file for complete search history.

(56) References Cited

U.S. PATENT DOCUMENTS

| | | | |
|---|---|---|---|
| 4,262,212 A | 4/1981 | Jacob et al. | |
| 4,658,346 A | 4/1987 | Templeton | |
| 4,835,405 A | 5/1989 | Clancey et al. | |
| 4,935,689 A | 6/1990 | Fujikawa et al. | |
| 4,992,920 A | 2/1991 | Davis | |
| 5,433,175 A | 7/1995 | Hughes et al. | |
| 5,563,802 A | 10/1996 | Plahn et al. | |
| 5,784,267 A | 7/1998 | Koenig et al. | |
| 6,392,371 B1 | 5/2002 | Cheng et al. | |
| 6,624,533 B1 | 9/2003 | Swanson et al. | |
| 6,765,157 B2 | 7/2004 | Rademacher et al. | |
| 6,801,019 B2 | 10/2004 | Haydock et al. | |
| 6,844,706 B2 | 1/2005 | Pinkerton, III et al. | |
| 6,965,818 B2 | 11/2005 | Koenig et al. | |
| 6,969,922 B2 | 11/2005 | Welches et al. | |
| 6,972,972 B2 | 12/2005 | Duncan et al. | |
| 6,984,897 B2 | 1/2006 | Skeist et al. | |
| 6,994,360 B2 | 2/2006 | Kuang et al. | |
| 7,102,331 B2 | 9/2006 | Walter et al. | |
| 7,453,164 B2* | 11/2008 | Borden et al. ............. | 290/42 |
| 7,456,509 B2* | 11/2008 | Gray, Jr. ................. | 290/40 C |
| 7,459,800 B2* | 12/2008 | Boisvert et al. ........... | 290/40 C |
| 2003/0080622 A1 | 5/2003 | Koenig | |
| 2004/0199297 A1 | 10/2004 | Schaper et al. | |
| 2005/0035657 A1 | 2/2005 | Brummett et al. | |
| 2005/0141154 A1 | 6/2005 | Consadori et al. | |
| 2006/0052922 A1 | 3/2006 | Koenig et al. | |

* cited by examiner

*Primary Examiner*—Nicholas Ponomarenko
*Assistant Examiner*—Iraj A Mohandesi
(74) *Attorney, Agent, or Firm*—J. Bruce Schelkopf; L. Scott Paynter; Krieg DeVault LLP

(57) ABSTRACT

An electric power system includes an engine, a generator driven by the engine, an electrical energy storage device, power control circuitry coupling the generator and storage device together, and a processor coupled to the circuitry. The generator provides variable AC power and the storage device provides variable DC power to the circuitry. The processor executes operating logic to provide control signals to the circuitry to operate the generator at a first speed to provide a first level of AC electricity, increase the DC power provided from the storage device to increase the AC electricity to a second level, increase operating speed of the generator from the first speed to a second speed greater than the first speed, decrease the DC power from the storage device as the operating speed of the generator increases, and limit acceleration of the operating speed to reduce perception of a speed change.

7 Claims, 5 Drawing Sheets

ELECTRIC POWER GENERATION SYSTEM CONTROLLED TO REDUCE PERCEPTION OF OPERATIONAL CHANGES

BACKGROUND

The present invention relates to electric power systems, and more particularly, but not exclusively, relates to management of electric power provided by a system including a variable speed generator driven by an engine and an electric energy storage device.

In many applications of electrical generator systems, load demand is typically low relative to generator power capacity. In contrast, generator selection is often driven by peak power requirements, resulting in an "oversized" generator most of the time. As an alternative, in certain situations power generation systems could include an electrical energy storage device to supplement generator power during peak usage, which facilitates a reduction in generator size. The generator can be selected with sufficient capacity to charge the storage device at the same time it supplies power to electrical loads below a given level.

In certain applications, a power system is installed in a vehicle that includes a dedicated engine/generator set and electrical energy storage device in the form of one or more electrochemical batteries. The noise resulting from generator operation can be of concern under certain circumstances making it desirable to provide a "silent" operating mode, during which time power is sourced only from the batteries and the engine/generator set is inactive. In most current applications, the engine/generator set subsystems and the electrical energy storage device subsystems come from independent sources and tend to work independent of one another. Unfortunately, the ability to desirably integrate and collectively manage generator and electrical storage device operation can be challenging. Alternatively or additionally, it can prove challenging to reduce size/weight of the power system and/or attendant noise/vibration caused by engine/generator set operation. Thus, there is an ongoing demand for further contributions in this area of technology.

SUMMARY

One embodiment of the present invention includes a unique technique involving electric power generation, storage, delivery, and/or control. Other embodiments include unique methods, systems, devices, and apparatus involving the generation, storage, delivery, and/or control of electric power. Further embodiments, forms, features, aspects, benefits, and advantages of the present application shall become apparent from the description and figures provided herewith.

DETAILED DESCRIPTION OF REPRESENTATIVE EMBODIMENTS

Figure 1:
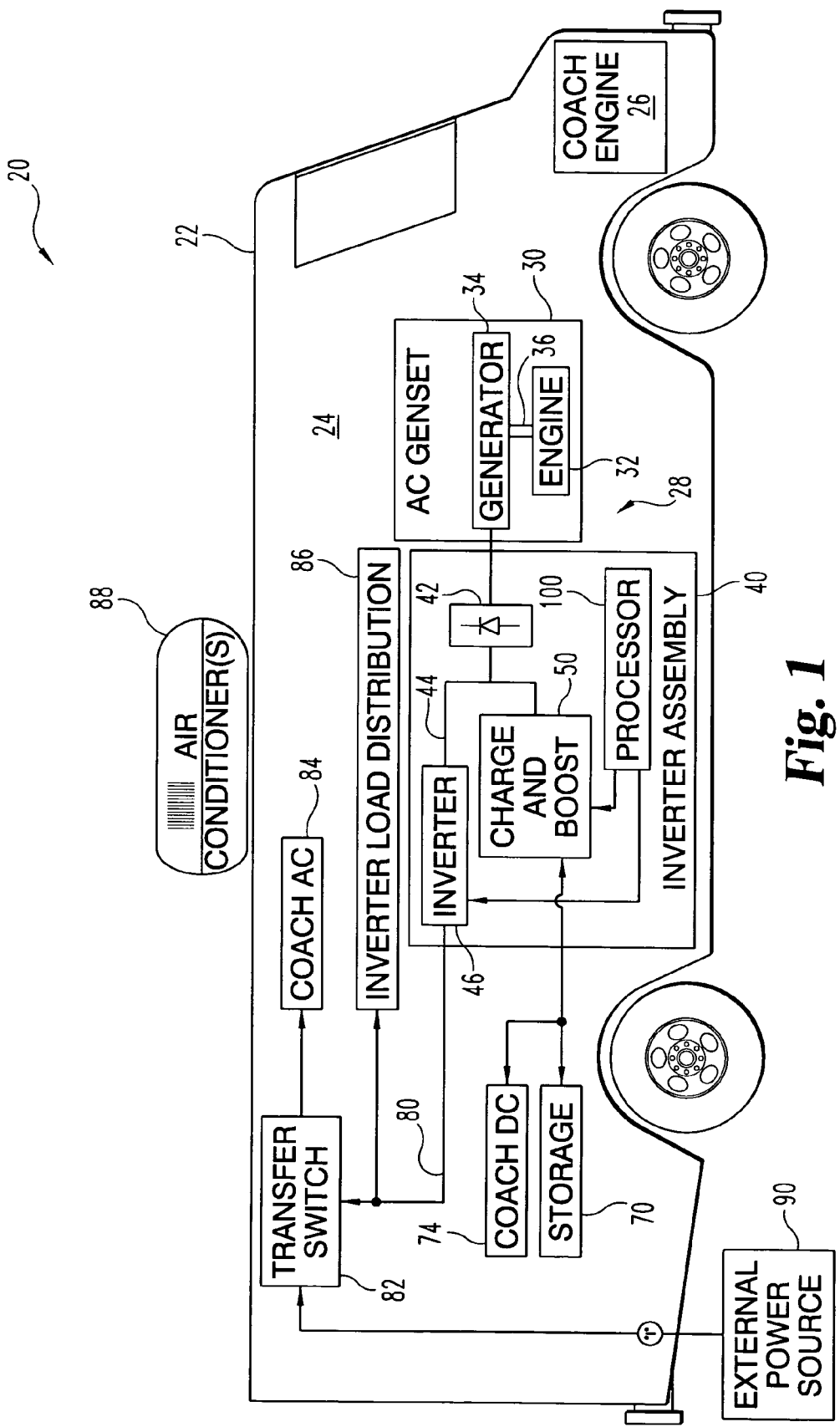
FIG. 1 is a diagrammatic view of a vehicle carrying an electric power generation system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

One embodiment of the present invention is directed to an electric power generation and storage system that includes a variable speed generator and electrical energy storage device. In one form, this system is carried on board a land or marine vehicle, and is particularly suited to meeting the electric power needs of a vehicle cabin and/or other living space. For such spaces, electrical power is typically desired for lighting, kitchen appliances, air conditioning, audio/visual equipment, or the like. In other forms, this system is provided as a back-up electric power source or as a primary electric power source in remote areas lacking access to an electric utility power grid—to mention only a few possibilities.

In another embodiment, FIG. 1 illustrates vehicle 20 in the form of a motor coach 22. Motor coach 22 includes interior living space 24 and is propelled by coach engine 26. Coach engine 26 is typically of a reciprocating piston, internal combustion type. To complement living space 24, coach 26 carries various types of electrical equipment 27, such as one or more air conditioner(s) 88. Equipment 27 may further include lighting, kitchen appliances, entertainment devices, and/or such different devices as would occur to those skilled in the art. Coach 22 carries mobile electric power generation system 28 to selectively provide electricity to equipment 27. Correspondingly, equipment 27 electrically loads system 28. In one form, various components of system 28 are distributed throughout vehicle 20—being installed in various bays and/or other dedicated spaces.

System 28 includes two primary sources of power: Alternating Current (AC) power from genset 30 and Direct Current (DC) power from electrical energy storage device 70. Genset 30 includes a dedicated engine 32 and three-phase AC generator 34. Engine 32 provides rotational mechanical power to generator 34 with rotary drive member 36. In one arrangement, engine 32 is of a reciprocating piston type that directly drives generator 34, and generator 34 is of a permanent magnet alternator (PMA) type mounted to member 36, with member 36 being in the form of a drive shaft of engine 32. In other forms, generator 34 can be mechanically coupled to engine 32 by a mechanical linkage that provides a desired turn ratio, a torque converter, a transmission, and/or a different form of rotary linking mechanism as would occur to those skilled in the art. Operation of engine 32 is regulated via an Engine Control Module (ECM) (not shown) that is in turn responsive to control signals from control and inverter assembly 40 of system 28.

The rotational operating speed of engine 32, and correspondingly rotational speed of generator 34 varies over a selected operating range in response to changes in electrical loading of system 28. Over this range, genset rotational speed increases to meet larger power demands concomitant with an increasing electrical load on system 28. Genset 30 has a steady state minimum speed at the lower extreme of this speed range corresponding to low power output and a steady state maximum speed at the upper extreme of this speed range corresponding to high power output. As the speed of genset 30 varies, its three-phase electrical output varies in terms of AC frequency and voltage.

Genset 30 is electrically coupled to assembly 40. Assembly 40 includes power control circuitry 40a to manage the electrical power generated and stored with system 28. Circuitry 40a includes three-phase rectifier 42, variable voltage DC power bus 44, DC-to-AC power inverter 46, charge and boost circuitry 50, and processor 100. Assembly 40 is coupled to storage device 70 to selectively charge it in certain operating modes and supply electrical energy from it in other operating modes via circuitry 50 as further described hereinafter. Assembly 40 provides DC electric power to the storage device one or more motor coach DC loads 74 with circuitry 50 and provides regulated AC electric power with inverter 46. AC electric loads are supplied via inverter AC output bus 80. Bus 80 is coupled to AC power transfer switch 82 of system 28. One or more coach AC electrical loads 84 are supplied via switch 82. System 28 also provides inverter load distribution 86 from bus 80 without switch 82 intervening therebetween.

As shown in FIG. 1, switch 82 is electrically coupled to external AC electrical power source 90 (shore power). It should be appreciated that shore power generally cannot be used when vehicle 20 is in motion, may not be available in some locations; and even if available, shore power is typically limited by a circuit breaker or fuse. When power from source 90 is applied, genset 30 is usually not active. Transfer switch 82 routes the shore power to service loads 84, and those supplied by inverter load distribution 86. With the supply of external AC power from source 90, assembly 40 selectively functions as one of loads 84, converting the AC shore power to a form suitable to charge storage device 70. In the following description, AC shore power should be understood to be absent unless expressly indicated to the contrary.

Assembly 40 further includes processor 100. Processor 100 executes operating logic that defines various control, management, and/or regulation functions. This operating logic may be in the form of dedicated hardware, such as a hardwired state machine, programming instructions, and/or a different form as would occur to those skilled in the art. Processor 100 may be provided as a single component, or a collection of operatively coupled components; and may be comprised of digital circuitry, analog circuitry, or a hybrid combination of both of these types. When of a multi-component form, processor 100 may have one or more components remotely located relative to the others. Processor 100 can include multiple processing units arranged to operate independently, in a pipeline processing arrangement, in a parallel processing arrangement, and/or such different arrangement as would occur to those skilled in the art. In one embodiment, processor 100 is a programmable microprocessing device of a solid-state, integrated circuit type that includes one or more processing units and memory. Processor 100 can include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, memory devices, and/or different circuitry or functional components as would occur to those skilled in the art to perform the desired communications. In one form, processor 100 includes a computer network interface to facilitate communications the using the industry standard Controller Area Network (CAN) communications among various system components and/or components not included in the depicted system, as desired.

Figure 2:
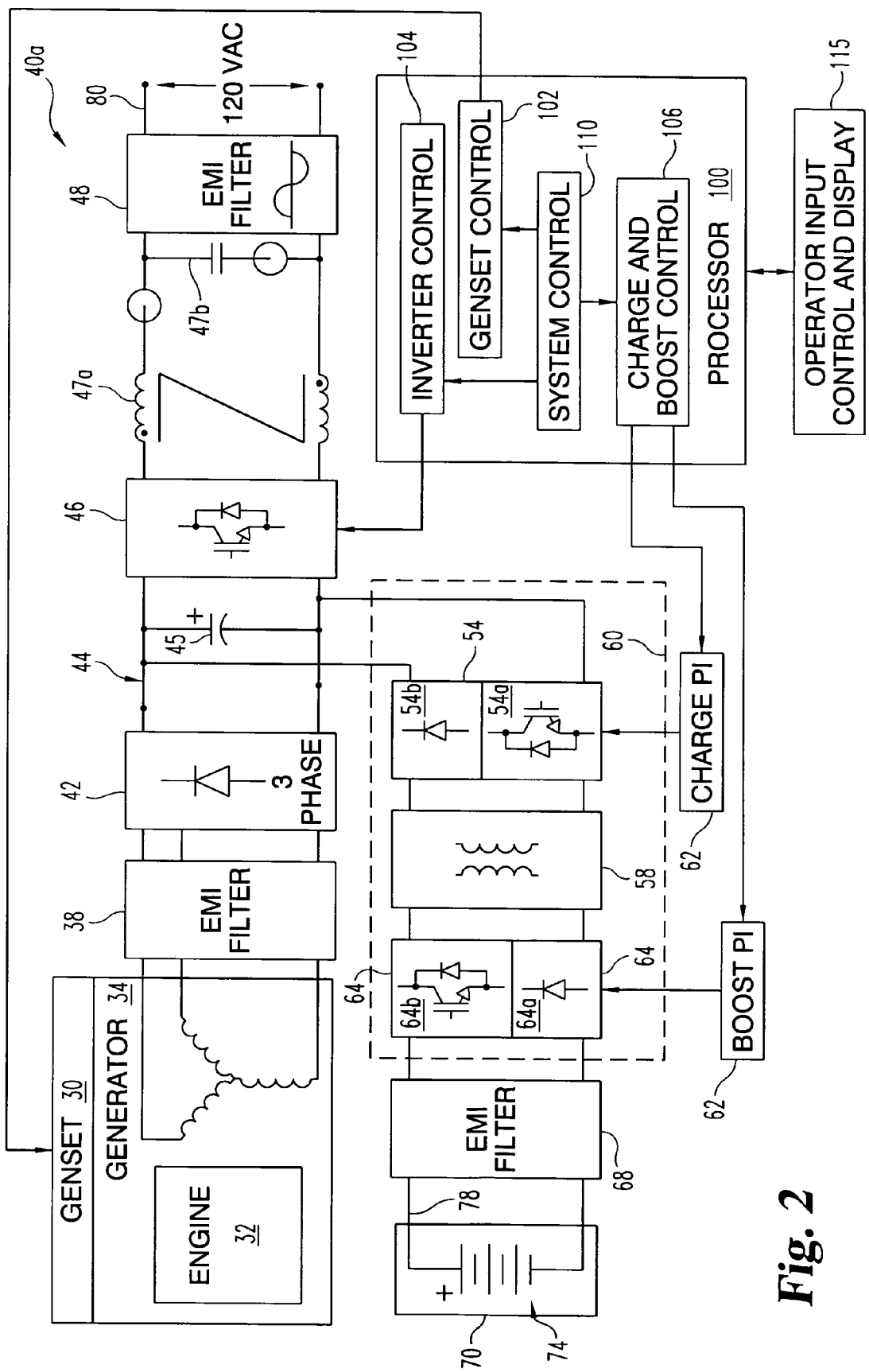
FIG. 2 is a schematic view of circuitry included in the system of FIG. 1.
Figure 3:
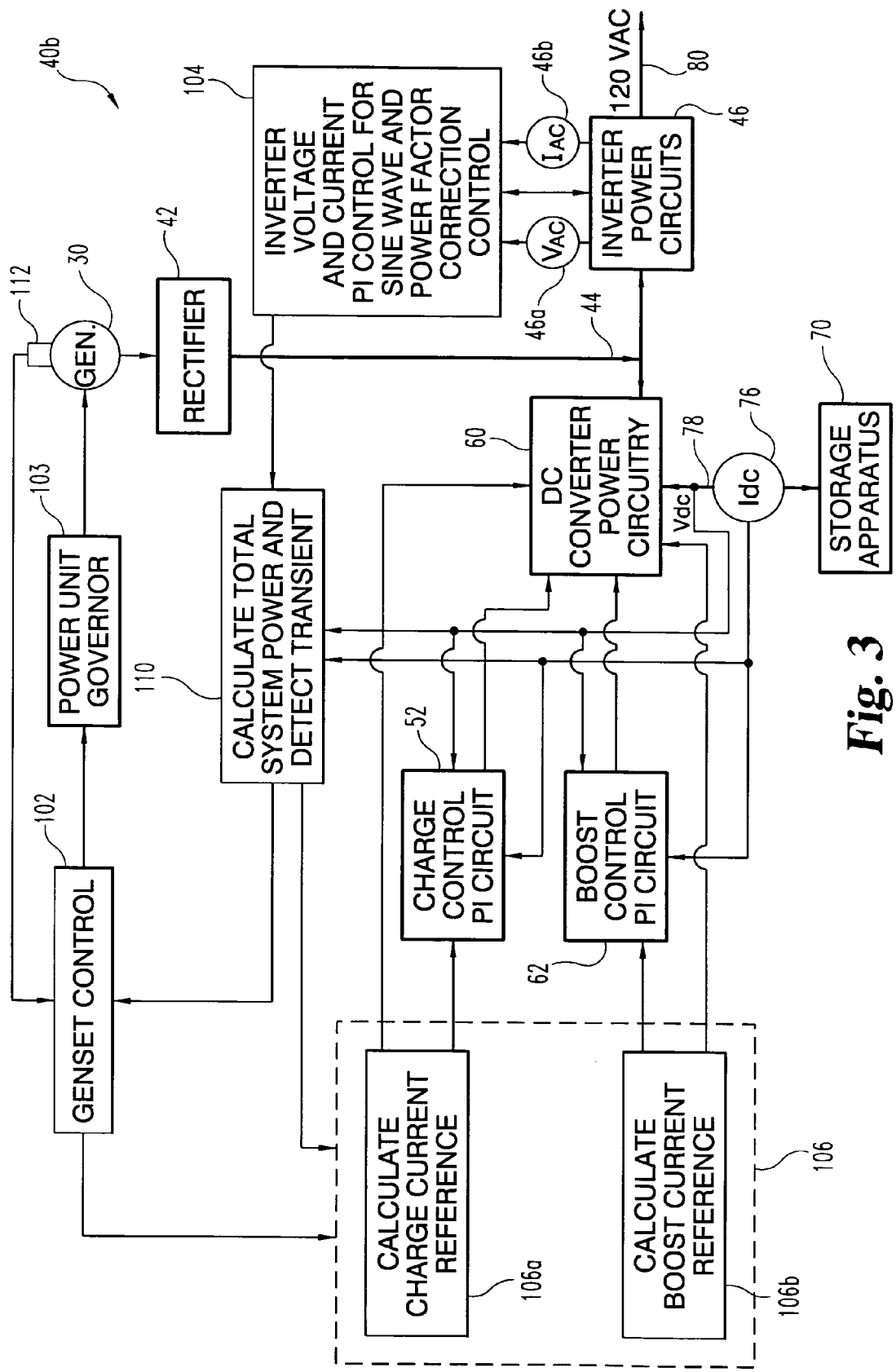
FIG. 3 is a control flow diagram for the circuitry of FIG. 2.

Referring additionally to the schematic circuit view of FIG. 2 and the control flow diagram of FIG. 3, selected aspects of system 28 are further illustrated; where like reference numerals refer to like features previously described. In FIG. 3, blocks formed with heavier line weighting correspond to hardware-implemented functionality, and blocks formed with lighter line weighting correspond to software-implemented functionality provided by programming of processor 100. Assembly 40 includes Electromagnetic Interference (EMI) filter 38 coupled to three-phase rectifier 42. In one form, rectifier 42 is implemented with a standard six diode configuration applicable to three-phase AC-to-DC conversion. Rectifier 42 receives the EMI-filtered, three-phase AC electric power output from genset 30 when genset 30 is operational. Filter 38 removes certain time varying characteristics from the genset output that may result in undesirable inference and rectifier 42 converts the filtered three-phase AC electric power from genset 30 to a corresponding DC voltage on bus 44.

At least one capacitor 45 is coupled across DC bus 44 to reduce residual "ripple" and/or other time varying components. The DC voltage on bus 44 is converted to an AC voltage by inverter 46 in response to inverter control logic 104 of processor 100. In one form, inverter 46 is of a standard H-bridge configuration with four Insulated Gate Bipolar Transistors (IGBTs) that is controlled by Pulse Width Modulated (PWM) signals from processor 100. In other forms, inverter 46 can be comprised of one or more other switch types such as field effect transistors (FETs), gated thyristors, silicon controlled rectifiers (SCRs), or the like. The PWM control signals from logic 104 selectively and individually drive the gates/switches of inverter 46. Typically, these control signals are input to intervening power drive circuitry coupled to inverter gates, and the control signals are isolated by opto-isolators, isolation transformers, or the like. Inverter control logic 104 includes a Proportional-Integral (PI) controller to synthesize an approximate sinusoidal AC waveform. Sensing arrangement 45 includes AC voltage sensor 46a and AC current sensor 46b. Inverter control logic 110 receives AC voltage (VAC) from voltage sensor 46a and AC current (IAC) from current sensor 46b that correspond to the power delivered to bus 80 from inverter 46. The VAC and IAC inputs to logic 104 are utilized as feedback to generate the sinusoidal waveform for the output power with a PI controller. In addition, these inputs are used to calculate power properties required to control sharing functions for the overall system determine the power factor for the sinusoidal voltage and current outputs to facilitate power factor correction via a PI controller. Control logic 110 receives AC power output information from inverter control logic 104. This information can be used to determine system power, and is used to compare with the power delivery capacity of genset 30 and device 70 to regulate certain operations described hereinafter. Furthermore, logic 110 uses this AC output information to determine whether a transient power condition exists that warrants consideration in such operations.

Inductor 47a and capacitor 47b provide further filtering and conversion of the inverter 46 output to a desired AC power waveform. EMI filter 48 provides interference filtering of the resulting AC power waveform to provide a regulated single-phase AC power output on bus 80. In one nonlimiting example, a nominal 120 VAC, 60 Hertz (Hz) output is provided on bus 80, the genset three-phase output to rectifier 42 varies over a voltage range of 150-250 volts AC (VAC) and a frequency range of 200-400 Hertz (Hz), and the variable voltage on DC bus 44 is between 200 and 300 volts DC (Vdc)

In addition to inverter control logic 104, processor 100 includes genset power request control logic 102 to regulate rotational speed of genset 30 relative to system 28 operations. Logic 102 provides input signals to genset 30 that are representative of a requested target load to be powered by genset 30. Genset governor 103 of genset 30 responds to logic 102 to adjust engine rotational speed, which in turn adjusts rotational speed of generator 34. Control by logic 102 is provided in such a manner that results in different rates of genset speed change (acceleration/deceleration) depending on one or more conditions (like transients), as more fully explained in connection with FIGS. 4 and 5 hereinafter.

In one particular form, governor 103 is implemented in an Engine Control Module (ECM) included with genset 30 that communicates with processor 100 over a CAN interface. Alternatively or additionally, at least a portion of governor 103 can be included in assembly 40. Speed control logic 102 is responsive to system control logic 110 included in the operating logic of processor 100, and an engine speed feedback signal provided by engine speed sensor 112. Speed adjustment with logic 102 can arise with changes in electrical loading and/or charge or boost operations of device 70, as further described hereinafter. In turn, logic 102 provides control inputs to charge and power boost control logic 106.

Controllable DC-to-DC converter 60 is electrically coupled to DC bus 44 and electrical energy storage device 70. In FIG. 2, device 70 is more specifically illustrated in the form of electrochemical battery device 75 as shown in FIG. 2. Electrical current flow between device 70 and converter 60 is monitored with current sensor 76 and DC voltage of device 70 is monitored at node 78. In one embodiment, more than one current sensor and/or current sensor type may be used (not shown). For example, in one arrangement, one sensor may be used to monitor current of device 70 for power management purposes (such as a Hall effect sensor type), and another sensor may be used in monitoring various charging states (such as a shunt type). In other embodiments, more or fewer sensors and/or sensor types may be utilized.

Converter 60 provides for the bidirectional transfer of electrical power between DC bus 44 and device 70. Converter 60 is used to charge device 70 with power from DC bus 44, and to supplement (boost) power made available to DC bus 44 to service power demand on bus 80. Converter 60 includes DC bus interface circuitry 54 and storage interface circuitry 64 under the control of charge and power boost control logic 106. Bus interface circuitry 54 includes a charge inverter 54a and power boost rectifier 54b. Storage interface circuitry 64 includes charge rectifier 64a and power boost inverter 64b. Transformer 58 is coupled between circuitry 54 and circuitry 64. Charge inverter 54a and boost inverter 64b can be of an H-bridge type based on IGBTs, FETs (including MOSFET type), gated thyristors, SCRs, or such other suitable gates/switching devices as would occur to those skilled in the art. Further, while rectifiers 54b and 64a are each represented as being distinct from the corresponding inverter 54a or 64b, in other embodiments one or more of rectifiers 54b and 64a can be provided in the form of a full wave type comprised of the protective "free wheeling" diodes electrically coupled across the outputs of the respective inverter 54a or 64b component. For rectifier operation of this arrangement, the corresponding inverter components are held inactive to be rendered nonconductive.

Charge Proportional-Integral (PI) control circuit 52 is electrically coupled to charge inverter 54a and power boost PI control circuit 62 is electrically coupled to power boost inverter 64b. Circuits 52 and 62 each receive respective charge and boost current references 106a and 106b as inputs. Electrical current references 106a and 106b are calculated by charge and power boost control logic 106 with processor 100. These references are determined as a function of power demand, system power available, and the presence of any transient power conditions. The total system power is in turn provided as a function of the power provided by inverter 46 to bus 80 (inverter power), the power-generating capacity of genset 30, and the power output capacity of device 70. The inverter power corresponds to the AC electrical load "power demand" as indicated by the VAC voltage, IAC current, and corresponding power factor that results from electrical loading of bus 80. The genset power-generating capacity is determined with reference to genset power/load requested by logic 102. When the power demand on bus 80 can be supplied by genset 30 with surplus capacity, then this surplus can be used for charging device 70 by regulating converter 60 with PI control circuit 52; and when the power demand exceeds genset 30 capacity, supplemental power can be provided to bus 80 from device 70 by regulating converter 60 with PI control circuit 62. Various aspects of dynamic "power sharing" operations of system 28 are further described in connection with FIGS. 4 and 5 hereinafter; however, further aspects of converter 60 and its operation are first described as follows.

Converter 60 is controlled with system control logic 110 to enable/disable charge and boost operations. Under control of logic 110, the charge mode of operation and the boost mode of operation are mutually exclusive—that is they are not enabled at the same time. When charge mode is enabled, the electrochemical battery form of device 70 is charged in accordance with one of several different modes depending on its charging stage. These charging stages may be of a standard type and may be implemented in hardware, software, or a combination thereof. In one form, a three-stage approach includes bulk, absorption, and float charging. When charging, circuit 52 outputs PWM control signals that drive gates of charge inverter 54a in a standard manner. Typically, the PWM control signals are input to standard power drive circuitry (not shown) coupled to each gate input, and may be isolated therefrom by optoisolators, isolation transformers, or the like. In response to the PWM input control signals, inverter 54a converts DC power from DC bus 44 to an AC form that is provided to rectifier 64a of circuitry 64 via transformer 58. Rectifier 64a converts the AC power from transformer 58 to a suitable DC form to charge battery device 75. In one form directed to a nominal 12 Vdc output of battery device 75, transformer 58 steps down the AC voltage output by inverter 54a to a lower level suitable for charging storage device 70. For nonbattery types of devices 70, recharging/energy storage in the "charge mode" is correspondingly adapted as appropriate.

When power boost mode is enabled, boost PI control circuit 62 provides PWM control signals to boost inverter 64b to control the power delivered from device 70. The circuit 62 output is in the form of PWM control signals that drive gates of boost converter 64b in a standard manner for an transformer boost configuration. Typically, these control signals are input to power drive circuitry (not shown) with appropriate isolation if required or desired. When supplementing power provided by generator 32, a current-controlled power boosting technique is implemented with circuit 62. Circuit 62 provides proportional-integral output adjustments in response the difference between two inputs: (1) boost current reference 106b and (2) storage device 70 current detected with current sensor 76. In response, inverter 64b converts DC power from device 70 to an AC form that is provided to rectifier 54b of circuitry 54 via transformer 58. Rectifier 64b converts the AC power from transformer 58 to a suitable DC form for DC bus 44. In one form directed to a nominal 12 Vdc output of device 70, transformer 58 steps up the AC voltage output from inverter 64b, that is converted back to DC power for bus 44.

It should be appreciated that the DC voltage on DC bus 44 is variable rather than regulated. The variation in voltage on DC 44 as AC power is supplied to bus 80 extends over a wide range as the speed of genset 30 and/or the boost power from or charge power to device 70 varies. In one preferred embodiment, the lower extreme of this range is at least 75% of the upper extreme of this range while providing power to electrical loads on bus 80. In a more preferred form, the lower extreme is at least 66% of the upper extreme. In an even more preferred form, the lower extreme is at least 50% of the upper extreme.

Figure 4:
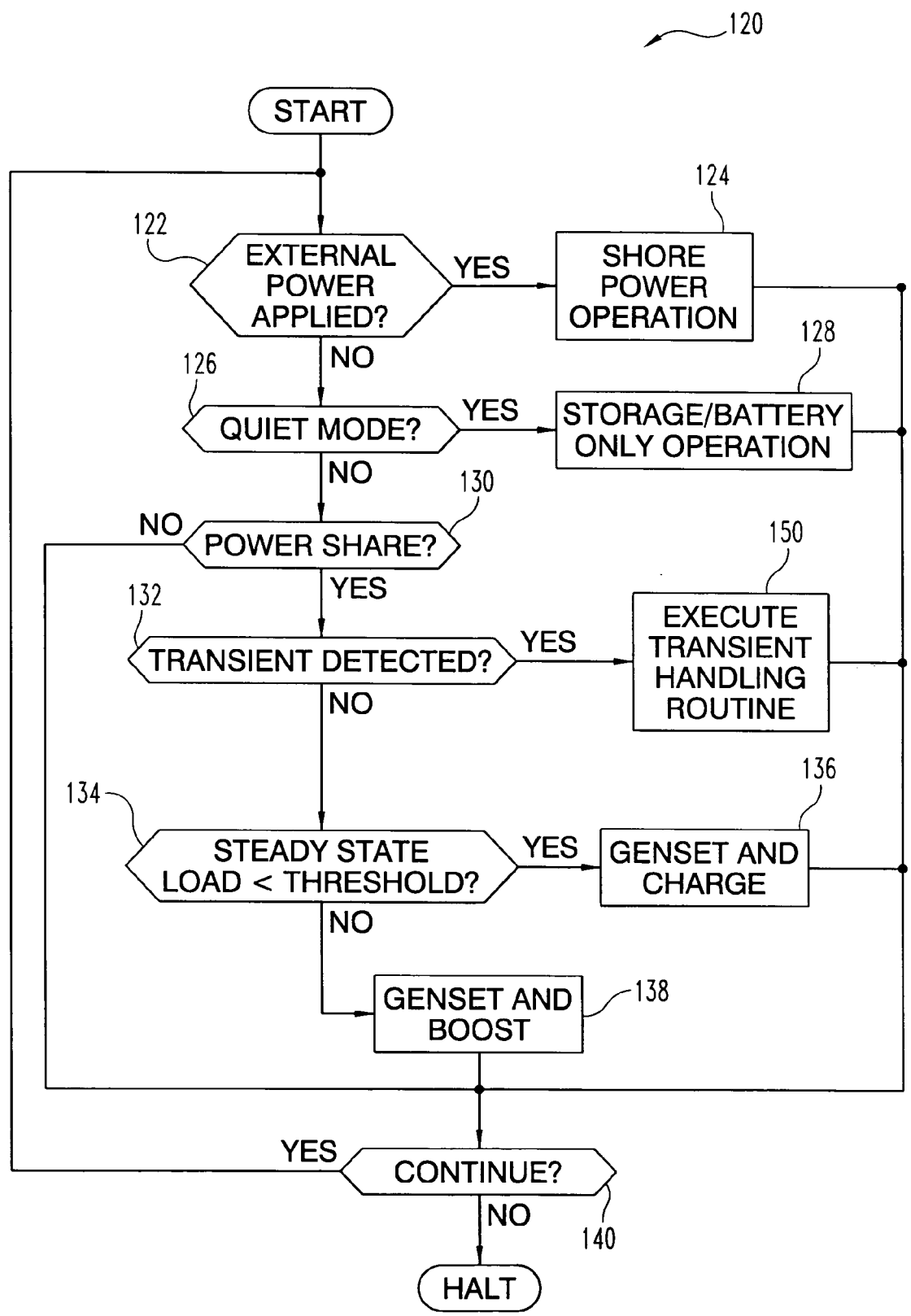
FIG. 4 is a flowchart of one procedure for operating the system of FIG. 1.

FIG. 4 depicts power management process 120 for system 28 that is performed in accordance with operating logic executed by processor 100. Also referring to FIGS. 1-3, process 120 begins with conditional 122 that tests whether shore power from external source 90 is being applied. If the test of conditional 122 is true (yes) then shore power operation 124 is performed. In operation 124, shore power is applied from bus 80 to charge apparatus 170. The AC shore power from bus 80 uses inductor 47a and circuit 46 to provide power factor correction, and is rectified through protective "free wheeling" diodes electrically coupled across each gate of inverter 46. The resulting DC voltage on bus 44 is regulated to a relatively constant value to the extent that the magnitude of the AC shore power on bus 80 remains constant. This DC voltage, as derived from shore power, is provided to converter 60 to charge battery 76. During operation 124, shore power is also provided to coach AC loads 84, to loads of inverter distribution 86 through transfer switch 82, and to coach DC loads 74.

If the test of conditional 122 is false (no), process 120 continues with conditional 126. Conditional 126 tests whether system 28 is operating in a quite mode. If the test of conditional 126 is true (yes), then the storage/battery only operation 128 is performed. Quite mode is typically utilized when the noise level resulting from the operation of genset 30 is not permitted or otherwise not desired and when shore power is not available or otherwise provided. Correspondingly, in operation 128 genset 30 is inactive, and power is provided only from storage device 70. For operation in this quiet mode, power delivered by storage device 70 is voltage-controlled rather than current-controlled, supplying a generally constant voltage to DC bus 44 to facilitate delivery of an approximately constant AC voltage on bus 80 of assembly 40. In one form, the AC power sourced from assembly 40 is only provided to loads for inverter distribution 86, with switch 82 being configured to prevent power distribution to coach AC loads 84. DC coach loads 74 are also serviced during operation 128.

Operator Input/Output (I/O) device 115 is operatively connected to processor 100 to provide various operator inputs to system 28 and output status information. In one form, device 115 includes a keypad or other operator input control that selects/deselects "quiet mode" operation, turns system 28 on/off, provides for a preset automatic starting/stopping time of system 28, one or more override commands, and/or directs other operational aspects of system 28. Device 115 also includes one or more output devices such as a visual display, audible alarm, or the like to provide information about the operation of system 28, various presets or other operator-entered operating parameters, and the like. In one nonlimiting form, device 115 is mounted in a cabin of coach 22 and is in communication with processor 100 in assembly 40 via CAN interfacing.

If the test of conditional 126 is false (no), then conditional 130 is encountered. Conditional 130 tests whether power share mode is active. In response to changes in electrical loading of system 28, the power share mode dynamically adjusts the speed of genset 30 and boost/charge operations based on total power capacity and transient status of system 28. It should be appreciated that total power accounts for: (a) ac power output from inverter 46 as measured by inverter voltage and current, (b) the dc power as measured at the storage device, and (c) the power loss intrinsic to inverter assembly 40. The loss calculation facilitates determination of a target genset speed and boost rate for steady state operation, as further discussed in connection with operation 138.

If the test of conditional 130 is true (yes), then conditional 132 is executed. Conditional 132 tests whether a power level change or transient has been detected during operation in the power share mode. If the test of conditional 132 is true (yes), then transient handling routine 150 is performed as further described in connection with FIG. 5. If the test of conditional 132 is false (no), then the power is at steady state in the power share mode. Steady state power delivery occurs in one of two ways contingent on the steady state electrical load magnitude. Conditional 134 implements this contingency. Conditional 134 tests whether the electrical load is below a selected threshold related to available genset 30 power (steady state genset rating). This test involves adding the dc and ac power levels, accounting for losses, and comparing the total power to the genset power rating to determine if simultaneous charging of device 70 can be performed. If so, the test of conditional 134 is true (yes) and operation 136 is performed.

In operation 136, a "genset plus charge" power share mode is supported that uses excess genset capacity for charging device 70, as needed (charge enabled/boost disabled). The genset plus charge power share mode of operation 136 typically reaches steady state from a transient condition as further described in connection with routine 150. The total genset power in the genset plus charge mode is determined as the measured ac power output plus the measured dc charging power less estimated charger losses. In one form, the charger loss is estimated by reference to one or more tables containing the loss of the charger circuitry as a function of battery voltage and charge current. The target genset speed is then determined based on the normalized load calculated by the above method. The genset speed is set to support the dc and ac loads. When the genset reaches the rated charge level, its speed may be reduced. As the ac power requirement approaches the genset rating, the charge rate may be reduced in order to maintain load support with genset 30.

If the test of conditional 134 is false (no), then operation 138 results. In operation 138, genset 30 and device 70 are both utilized to provide power to the electrical load at steady state in a "genset plus boost" power share mode. The desired boost rate is calculated based on total ac and dc power requirements less loss. This boost rate controls boost current to reach the desired power share between the genset and the storage device. The boost rate is calculated by determining the desired storage power contribution to the system load and referencing one or more tables that represent the loss of boost circuitry as a function of battery voltage and current.

Typically, for this steady state condition, genset 30 is operating at an upper speed limit with additional power being provided from device 70 in the boost enabled mode. It should be understood that this genset plus boost power share operation also typically reaches steady state from a transient condition as further described in connection with routine 150 as follows. In one form, the load calculations are normalized to a percent system rating, a percent boost capability and a percent genset load to facilitate system scaling for different genset and boost sizes. By way of nonlimiting example, a few representative implementations include a 7.5 kW genset and 2.5 kW boost for a total of 10 kW, a 5.5 kW genset and 2.5 kW boost for a total of 8 kW, and 12 kW genset and 3 kW boost for a total of 15 kW, and a 12 kW genset and 6 kW boost for a total of 18 kW. Naturally, in other embodiments, different configurations may be utilized.

Figure 5:
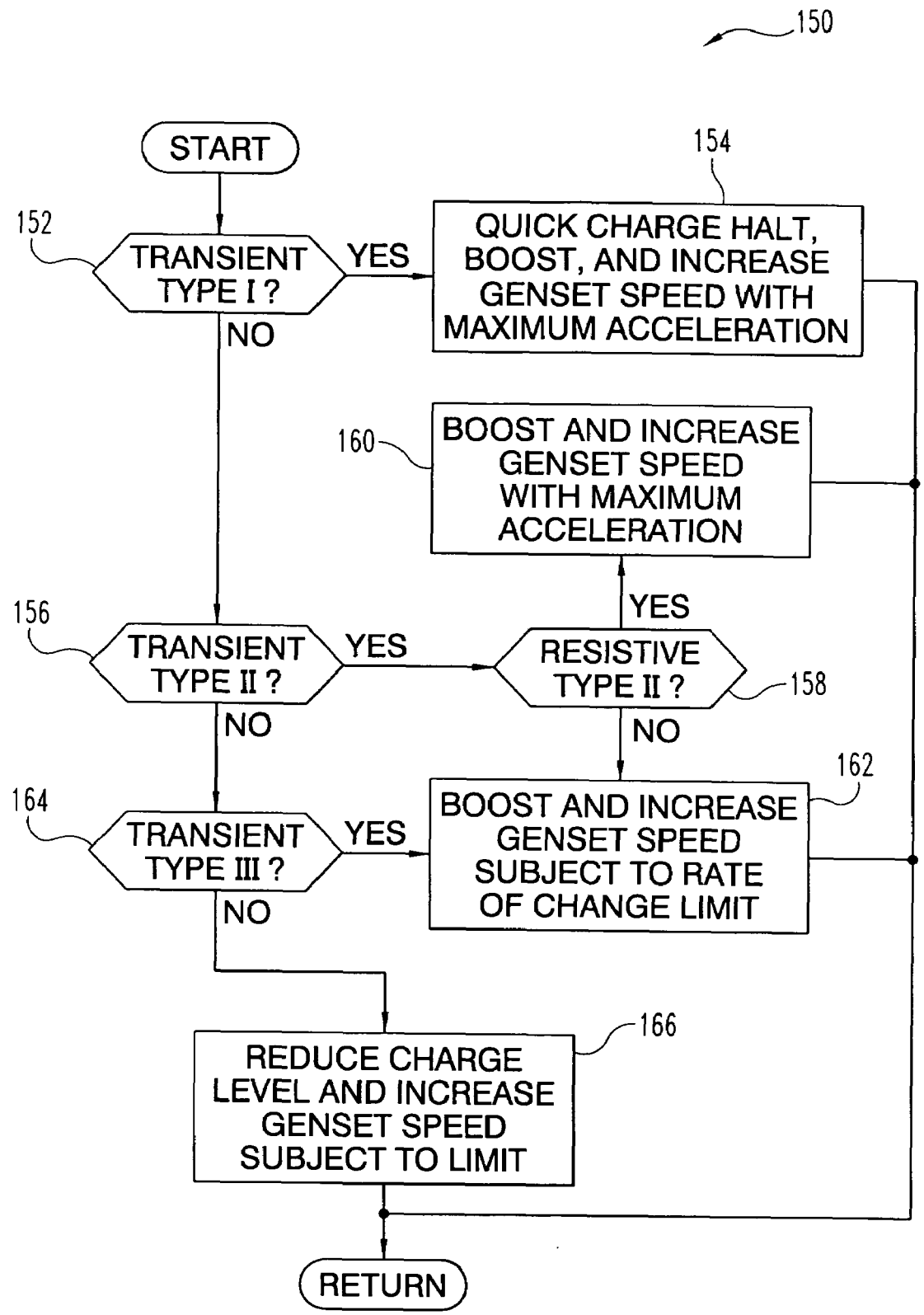
FIG. 5 is a flowchart for addressing different types of power transients with the circuitry of FIG. 2.

FIG. 5 depicts transient handling routine 150 in flowchart form. Routine 150 is executed by process 120 when conditional 132 is true (yes), which corresponds to a detected transient. As described in process 120 and routine 150, "transient" operation refers to a change in the electrical power delivered by system 28 that typically results from a change in electrical loading. In contrast, "steady state" operation refers to a generally constant load level and corresponding constant level of electrical power delivered by system 28. For purposes of clarity, process 120 and routine 150 distinguishes these modes of operation at a discrete logical level in a delineated sequence; however, it should be appreciated that implementation can be accomplished in a variety of different ways that may involve analog and/or discrete techniques with various operations performed in a different order and/or in parallel to provide dynamic shifts between steady state and transient operations in response to electrical load conditions.

Routine 150 distinguishes between different types of power transients based on changes in one or more properties of the output power relative to various thresholds. Further, as shown in the flowchart of FIG. 5, only transients corresponding to an increased power level are indicated ("positive" transients); however, it should appreciated that transients corresponding to a decreased power level ("negative" transients) can be handled in a complimentary or different manner. Collectively, four categories of positive transients are distinguished by routine 150: type I, type II, type III, and type IV that represent progressively smaller power excursions/levels. Selected negative transient operations also are described.

Routine 150 starts with conditional 152, which tests whether a type I transient has occurred. A type I transient is the most extreme type of transient power increase that typically corresponds to the addition of a large reactive load, such as that presented by the inductive current draw of motors for multiple air conditioners 88 that are activated at the same time, or when a resistive load exceeding the rating of the genset is applied. To detect this type of load, the change in current is monitored. An extremely large change in output current indicates a type I transient. If the test of conditional 152 is true (yes), operation 154 is performed that adjusts to the higher power level by immediately disabling charge mode (if applicable) and enabling the power boost mode at the maximum available power output level for device 70. At the same time, genset 30 increases speed at its maximum available acceleration to address the transient. It should be appreciated that even with maximum acceleration, genset 30 will reach its maximum power generating capacity more slowly than storage device 70. Provided that the target steady state power level is less than the steady state power capacity of both device 70 and genset 30 together (the system power capacity), then the level of power from device 70 decreases as genset speed increases to maintain the required power level. This complimentary decrease/increase of power from device 70/genset 30 continues until the maximum power capacity of genset 30 is reached. For this type of transient, the steady state power level typically remains greater than the capacity of genset 30 alone, so supplemental power from storage device 70 is also provided. After transient type I handling by operation 154 is complete, routine 150 returns to process 120. Absent any further transients, a steady state power share mode follows under operation 138 when the steady state power level is greater than the genset power capacity; however, should boost power not be required (a steady state power less than the power capacity of genset 30), then the power share mode under operation 136 results.

If the test of conditional 152 is false (no), then conditional 156 is executed. Conditional 156 tests for a type II transient. A type II transient depends on the transient size in relation to current charge and boost rates. In one form a type II transient results if its size exceeds the sum of the continuous boost rating and the current charge level. The type II transient can be further qualified with a power factor variable. For instance, in one implementation, if the power factor is lower than a selected threshold, the transient is classified as a type III instead of a type II transient. The type III transient is further discussed in connection with operation 166 hereinafter.

If the test of conditional 156 is true (yes), routine 150 proceeds to conditional 158 to determine if the type II transient is electrically resistive as opposed to reactive. To identify a large reactive load for a type I transient in conditional 152, the current is checked for certain extreme conditions on just a portion of an AC waveform cycle to hasten charge mode disable and boost mode enable (unless the boost mode is already active). In contrast, conditional 158 evaluates actual power factor based on a relatively longer portion of the AC waveform in correspondence to less extreme transient criteria. Typically, two AC cycles are evaluated under the conditional 158 test. If the test of conditional 158 is true (yes), then a resistive load type is indicated and operation 160 is performed. In operation 160, required boost power from device 70 and maximum acceleration of genset 30 are directed to rapidly meet the transitory load demand. The steady state power level remains greater than the capacity of genset 30 alone for a type II transient, and so it is ordinarily supplemented with storage device 70. After transient type II handling by operation 160 is complete, routine 150 returns to process 120. Absent any further transients, a steady state power share mode results under operation 138 (steady state power≧genset power capacity); however, should boost power not be required at steady state (steady state power<the genset power capacity), then the power share mode at steady state continues under operation 136. If the test of conditional 158 is false (no), then operation 162 is performed, which is described in greater detail below.

If the test of conditional 156 is false (no), then conditional 164 tests if a type III transient has taken place. If the test of conditional 164 is true (yes), operation 162 is executed. In operation 162, boost power from apparatus 170 is applied and genset speed is increased to meet the target power level subject to a rate of speed change limit as further described hereinafter. For one embodiment, the boost circuitry is arranged to provide as much as twice its continuous rating during transients of a relatively short duration. This duration generally corresponds to the amount of boost desired to support type I and type II transients resulting from reactive loads subject to an initial inrush current and to help engine 32 accelerate faster during large resistive loads. For reactive loads, such as a single air conditioner 88, the duration is long enough to support the initial inrush of a low power factor load (like an air conditioner compressor motor) and allow for the slower ramp-up of generator speed. The resulting load after starting can be less than the genset rating, which permits a slow ramp-up to the genset final speed resulting in a final steady-state mode of genset plus charge.

If the transient is resistive or otherwise of sufficient size such that the twice rated boost level cannot be maintained during a slow ramp, then the quick acceleration of the genset is desired. If the large load is resistive, the final mode is genset plus boost, and the boost rate will still decrease from its higher transient level to its maximum continuous rated level. Multiple air conditioners typically present such a sufficiently large enough load to prompt immediate acceleration, as described in connection with the type I transient of operation 154.

A type III transient corresponds to a power demand that can be handled by adding the required boost power to the already available power output of genset 30. As the speed of genset 30 increases, the level of power provided by device 70 decreases to maintain a given power level. From operation 162, routine 150 returns to process 120. If the steady state power level is greater than or equal to the power capacity of genset 30, then the genset 30 runs at maximum capacity/speed and is supplemented by supplemental power from storage device 70, resulting in the steady state power share mode of operation 138. In contrast, if the steady state power level is less than the genset power capacity, then the boost power goes to zero and is disabled as genset 30 reaches a speed corresponding to the steady state power level. Under this circumstance, charge mode is enabled resulting in the steady state power share mode of operation 136.

If conditional 164 is false (no), then a default type IV transient is assumed. A type IV transient corresponds to a power change and the target post-transient steady-state level less than the power generating capacity of genset 30. Correspondingly, operation 166 is executed. In operation 166, the level of charging of device 70 in the charge mode is reduced and the genset speed is increased. As the genset share of the power burden increases with its speed, the charge level can increase until the power for electrical load(s) and charging collectively reach the power generating capacity of genset 30, a maximum desired charge level is reached, or a desired power output of genset 30 results.

The genset speed increase in operation 162 and operation 166 is subject to a selected acceleration limit that has a magnitude less than the acceleration of genset 30 in operations 154 and 160 in response to type I and type II transients, respectively. Under certain situations, vibration and/or noise associated with the operation of a genset can be distracting to a human user with nominal sensory and cognitive capability—particularly in a parked vehicle. In some instances, this distraction can be reduced by using acoustic insulation, mechanical isolators, or the like. Even so, genset operation may still present a distraction under certain conditions. It has been found that abrupt changes in genset speed typically are more noticeable than slower speed changes. For the type III and IV transients of operations 162 and 166, the rotational speed of genset 30 is limited to a rate of change selected to reduce human perception of genset operation that might otherwise result from a more rapid increase in speed. It has been found that for typical motor coach and marine applications, load transients are predominately of the type III or type IV transient. Accordingly, the approach of routine 150 for such applications significantly reduces sudden speed changes during normal use.

Typically, the acceleration limit in operation 162 and 166 is substantially below the maximum acceleration available for genset 30. In one preferred form, the selected rate of speed change limit is less than or equal to 100 revolutions per minute (rpm) per second (100 rpm/s). In a more preferred form, the selected rate of speed change limit is less than or equal to 50 rpm/s. In an even more preferred form, this limit is less than or equal to 20 rpm/s. In a most preferred form, the limit is approximately 10 rpm/s. After the charge level and the genset speed stabilize for the type III or IV transient, routine 150 returns to process 120. In the absence of a further intervening transient, a steady state power share mode results in operation 136 and/or operation 138, depending on the steady state power level relative to the power generating capacity of genset 30.

In response to a negative transient to a lower target power level in the power share mode, the specific routine generally depends on the manner in which power is being supplied prior to the negative transient. For an initial steady state level provided with maximum boost power from device 70 and maximum power output genset 30, a decrease to a value greater than or equal to the power generating capacity of genset 30 is provided by commensurately lowering the boost power output from device 70. For a negative transient from a steady state power level in operation 138 to a steady state power level in operation 136, power from boost mode decreases down to zero after which charge mode is enabled, and genset speed is decreased subject to a rate of change limit less than the maximum available deceleration, analogous to the limited acceleration of genset 30 in connection with operations 162 and 166. Accordingly, the boost power level decrease is slowed to maintain a given power level. Once charging is enabled, deceleration of genset 30 would typically stop at a speed desired to maintain steady state power to the load and to perform charging level at a desired level. For decreasing load transients from a steady state power plus charge mode, charging is increased in response to the load reduction and/or genset speed is decreased with the rate of speed decrease being subject to a selected limit less than the maximum deceleration available. During a negative transient while boost is active, the boost rate can decrease by making a step change to a lower boost rate or disabling boost. If boost is disabled, charging typically increases to a desired charge rate as permitted by available capacity. As a result, genset 30 may run at a faster speed at steady state than required to sustain the resulting load because of the desired charge level. While the engine speed is typically ramped to reduce perception of a speed change during a negative transient, such speed may be decreased at its maximum rate if the negative transient is so large that it threatens to cause an unacceptably high voltage on DC bus 44. In one implementation, this threshold DC voltage is about 300 volts.

For type I-III transients, a typical sequence begins with the genset plus charge mode initially, disabling the charge mode, enabling the boost mode with a desired level of boost, ramping up the genset to a required speed that supports the final target AC load plus a desired charge load, decreasing the boost in conjunction with increasing the genset speed until boost reaches zero then re-enabling charge mode, ramping up charge level as the genset continues to ramp up until the total system load (ac+dc) is supported by the genset. In cases where the total system load exceeds genset capacity then charge is reduced or boost is used to support the ac load instead.

In one implementation, the system continues to update the total system load and update the boost and the target genset speed if additional transient events occur during the gradual acceleration of genset speed caused by a type III or IV transient. If additional transient events occur the transient may be reclassified as a type II or I transient and the system will process per the correct classification. It should also be noted that in a typical motor coach or marine application the load transients often predominately result in a type III or type IV transient. Generally, charging is enabled on a negative transient when the ac power becomes lower than the genset rated capacity, and the charge rate ramps up to match the deceleration rate of the genset until the genset speed matches the total system load (ac+dc). Also, the genset speed may be decreased at its maximum rate if the negative transient is significantly large enough to cause voltage on DC bus 44 to exceed an upper threshold. This limitation reduces the period of time (if any) that the DC bus 44 exceeds a desired upper level, such as 300 volts in one nonlimiting example.

Returning to process 120, operations 124, 128, 136, and 138 proceed to conditional 140. Conditional 140 tests whether to continue operation of process 120. If conditional 140 is true (yes), process 120 returns to conditional 122 to re-execute the remaining logic. If conditional 140 is false (no), process 120 halts. It should be recognized that process 120 and routine 150 are each symbolic logical representations of various dependent and independent functions that could be embodied and/or implemented in a number of different ways. For example, even though presented in an ordered, sequential manner, various conditionals and operations could be reordered, combined, separated, operated in parallel, and/or arranged in a different manner as would occur to one skilled in the art. Such alternatives encompass analog and/or discrete implementations. It should be recognized that in other embodiments different criteria could be used to detect transients and/or different transient responses could be provided. In one further embodiment, limiting acceleration and/or deceleration of genset 30 is not used at all or is subject to removal by operator command through operator input control and display 115. Alternatively or additionally, more or fewer transient types are recognized/detected and/or different criteria define one or more of various transient types. In certain operation modes, charging may be decreased or eliminated to reduce genset speed at steady state. Alternatively or additionally, boost power can be used in lieu of genset 30 at lower steady state power levels under the boost power capacity of storage device 70. This operation could be subject to a monitored reserve power level of storage device 70. Boost power could also be used to reduce power that otherwise could be provided by genset 30 to maintain genset 30 at a lower speed.

Many other embodiments of the present application exist. For example, one or more fuel cell devices, capacitive-based storage devices, and/or a different form of rechargeable electrical energy storage apparatus could be used as an alternative or addition to an electrochemical cell or battery type of storage device 70. Furthermore, one or more fuel cells (including but not limited to a hydrogen/oxygen reactant type) could be used to provide some or all of the power from genset 30 and/or energy storage device 70. Engine 32 can be gasoline, diesel, gaseous, or hybrid fueled; or fueled in a different manner as would occur to those skilled in the art. Further, it should be appreciated that engine 32 can be different than a reciprocating piston, intermittent combustion type, and/or coach engine 26 can be used in lieu of engine 32 to provide mechanical power to generator 34 or to supplement mechanical power provided by engine 32. In still another embodiment, the vehicle carrying system 28 is a marine vessel. In one variation of this embodiment, rotational mechanical power for generator 34 is provided from a propulsion shaft (such as a propeller shaft) with or without engine 32. Alternatively or additionally, generator 34 can be of a different type, including, but not limited to a wound field alternator, or the like with adaptation of circuitry/control to accommodate such different generator type, as desired.

Another embodiment includes more than one rectifier/DC bus/inverter circuit to convert electricity from a variable speed generator to a fixed frequency electric output. For one implementation, the generator is constructed with two isolated three-phase outputs that each supply electricity to a different inverter circuit, but the same engine serves as the prime mover. When multiple rectifier/DC bus/inverter circuits are used in this manner, some or all may include a charge/boost circuitry operating through the corresponding DC bus.

A further embodiment includes: driving a variable speed electric power generator with an engine that operates at a first rotational speed to provide electric power to one or more electrical loads at an initial level; increasing the electric power provided to the one or more electrical loads by increasing electrical energy provided from an electrical energy storage device in response to an electrical load increase; while maintaining the electric power at a greater level than the initial level, decreasing the electrical energy provided to the one or more electrical loads from the storage device and increasing operating speed of the generator from the first rotational speed to a second rotational speed greater than the first rotational speed; and during the increasing of the operating speed limiting a rate of change of the operating speed to a speed change rate selected to reduce human perception of a speed change.

Still a further embodiment of the present invention is directed to an electrical power generation system installed in a vehicle. This system includes a variable speed electric power generator driven by an engine and an electrical energy storage device. Also included are: means for operating the generator at a first rotational speed to provide electric power to one or more electrical loads at an initial power level, means for increasing the electric power provided to the one or more electrical loads by increasing electrical energy provided from an electrical energy storage device, means for decreasing the electrical energy provided to the one or more electrical loads from the storage device and increasing operating speed of the generator from the first rotational speed to a second rotational speed greater than the first rotational speed while maintaining the electric power at a greater level than the initial level, and means for limiting a rate of change in the operating speed to a speed change rate that is less then another rate of speed change that can be performed with the system as the operating speed increases.

Another embodiment comprises: providing electric power to one or more electrical loads from an electrical energy storage device and a variable speed generator operating at a first rotational speed; decreasing an amount of the electric power provided to the one or more electrical loads from the storage device while increasing operating speed of the generator from the first rotational speed to a second rotational speed greater than the first rotational speed; limiting the increasing of the operating speed of the generator to be less than or equal to a first rate of change; and accelerating the operating speed of the generator at a second rate of change greater than the first rate of change in response to a power transient.

Yet another embodiment is directed to a system that includes an engine, a variable speed generator mechanically coupled to the engine, an electrical energy storage device, power control circuitry electrically coupled to the generator and the electrical energy storage device, and a processor. The engine is structured to drive the generator to provide variable AC power. The processor is operatively coupled to the power control circuitry and executes operating logic to provide control signals to the power control circuitry to: operate the generator at a first rotational speed to provide AC electricity at a first level, increase the DC power provided from the electrical energy storage device to increase the AC electricity to a second level in response to an electrical load change, increase operating speed of the generator from the first rotational speed to a second rotational speed greater than the first rotational speed in response to the load change, decrease the DC power from the electrical energy storage device as the operating speed of the generator increases, and limit the rate of change of the operating speed of the generator to a first speed change rate that is less than a second speed change rate of the generator.

Still another embodiment of the present application includes an apparatus comprising: a vehicle with an electric power generating system that includes an engine, a variable speed generator, and an electrical energy storage device coupled together by power control circuitry. This power control circuitry further includes: means for providing electric power to one or more electrical loads from the electrical energy storage device and the variable speed generator operating at a first rotational speed; means for decreasing an amount of the electric power provided to the one or more electrical loads from the storage device while increasing operating speed of the generator from the first rotational speed to a second rotational speed greater than the first rotational speed during a first mode of system operation; means for limiting the operating speed to a rate of change less than or equal to a first rate of change during the first mode of system operation; and means for accelerating the rotational speed of the generator to a third rotational speed at a second rate of change greater than the first rate of change during a second mode of system operation.

A further embodiment includes: inverting DC electric power from a DC bus to provide AC electricity to one or more electrical loads; rectifying AC power output from a variable speed generator to provide a variable amount of electric power to the DC bus; measuring AC electric power provided to the one or more electrical loads; determining a power control reference that changes with variation of a difference between the AC electric power and capacity of the generator to provide power to the DC bus; and adjusting DC electric power output from an electrical energy storage device to the DC bus in response to change in the power control reference.

Still another embodiment comprises: inverting DC electric power from a DC bus to provide AC electricity to one or more electrical loads; rectifying AC power from a variable speed generator to provide a first variable amount of electric power to the DC bus; detecting voltage and current applied to the one or more electrical loads; determining a power control reference as a function of the voltage and the current; and regulating DC power from an electrical energy storage device to provide a second variable amount of electric power to the DC bus.

A further embodiment is directed to a system, comprising: an inverter to provide AC electrical power to one or more electrical loads; a variable voltage DC bus electrically coupled to the inverter to provide DC electric power to the inverter; a controllable converter electrically coupled to the variable voltage DC bus and an electrical energy storage apparatus electrically coupled to the controllable converter to provide a first portion of the DC electric power to the variable voltage DC bus; a variable speed generator to supply a variable AC power output; a rectifier electrically coupled between the variable speed generator and the variable voltage DC bus to provide a second portion of the DC electric power rectified from the AC power output; and a sensing arrangement to detect voltage and current provided to the one or more electrical loads from the variable voltage DC bus. Control circuitry is also included that is coupled to the controllable converter and the sensing arrangement. The control circuitry is responsive to the voltage and the current to generate a power control signal indicative of a change in the AC electrical power provided to the one or more electrical loads, the controllable converter being responsive to the power control signal to change the second portion of the DC electric power provided to the variable voltage DC bus from the controllable converter.

In yet a further embodiment, an apparatus, includes: a variable speed generator; an electrical energy storage device; a DC bus coupled to the variable speed generator and the electrical energy storage device; means for inverting DC electric power from the DC bus to provide AC electricity to one or more electrical loads; means for rectifying AC power output from the variable speed generator to provide a variable amount of electric power to the DC bus; means for measuring AC electric power provided to the one or more electrical loads; means for determining a power control reference that changes with a difference between the AC electric power and capacity of the generator to provide power to the DC bus; and means for adjusting DC electric power output from the electrical energy storage device to the DC bus in response to change in the power control reference.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. A method, comprising:
    driving a variable speed electric power generator with an engine, the generator operating at a first rotational speed to provide electric power to one or more electrical loads at an initial level;
    in response to an electrical load increase, increasing the electric power provided to the one or more electrical loads by increasing electrical energy provided from an electrical energy storage device;
    while maintaining the electric power at a greater level than the initial level, decreasing the electrical energy provided to the one or more electrical loads from the storage device and increasing operating speed of the generator from the first rotational speed to a second rotational speed greater than the first rotational speed; and during the increasing of the operating speed, limiting a rate of change of the operating speed to a speed change rate selected to reduce human perception of a speed change.

2. The method of claim 1, which includes decreasing the rotational operating speed of the generator subject to a rate of speed change limitation, the rate of speed change limitation being less than a maximum available rate of speed change of the engine.

3. The method of claim 1, wherein the speed change rate is less than a higher rate of speed change of the generator, and which includes:

detecting a power transient; and accelerating the generator at the higher rate of speed change in response to the power transient.

4. The method of claim 1, which includes:

installing the generator, the engine, and the storage device in a vehicle;

carrying the one or more electrical loads with the vehicle; and electrically coupling the one or more electrical loads to an inverter, the inverter being coupled to a DC bus, the DC bus being coupled to the generator and the storage device installed in the vehicle.

5. The method of claim 4, wherein the one or more electrical loads include at least one air conditioner to provide cooling inside the vehicle.

6. The method of claim 1, which includes:

determining an amount of AC electrical power provided to the one or more loads; and adjusting a DC power level provided by the storage device in response to the amount of AC power.

7. The method of claim 1, which includes:

simultaneously providing an AC electric power output from the generator and a DC electric power output from the storage device to a variable voltage DC bus;

inverting DC power from the DC bus to provide AC power to the one or more loads; and permitting voltage on the DC bus to vary during the providing and the inverting over a range that extends from a nonzero minimum to a nonzero maximum with the nonzero minimum being 75% or less of the nonzero maximum.

* * * * *